H. C. Green,

Circular Saw Mill.

Nº 13,944.   Patented Dec. 18, 1855.

UNITED STATES PATENT OFFICE.

H. C. GREEN, OF CLARENCE, WISCONSIN.

AUTOMATIC FEED-MOTION FOR SAWMILLS.

Specification of Letters Patent No. 13,944, dated December 18, 1855.

*To all whom it may concern:*

Be it known that I, HENRY C. GREEN, of Clarence, in the county of Green and State of Wisconsin, have invented a new and Improved Mode of Operating Sawmill-Carriages so as to Regulate the Feed of the Log to the Saw as Occasion Requires, the device being self-acting; and I do hereby declare that the following is a full, clear, and exact description of the same, reference being had to the annexed drawings, making a part of this specification, in which—

Figure 1:
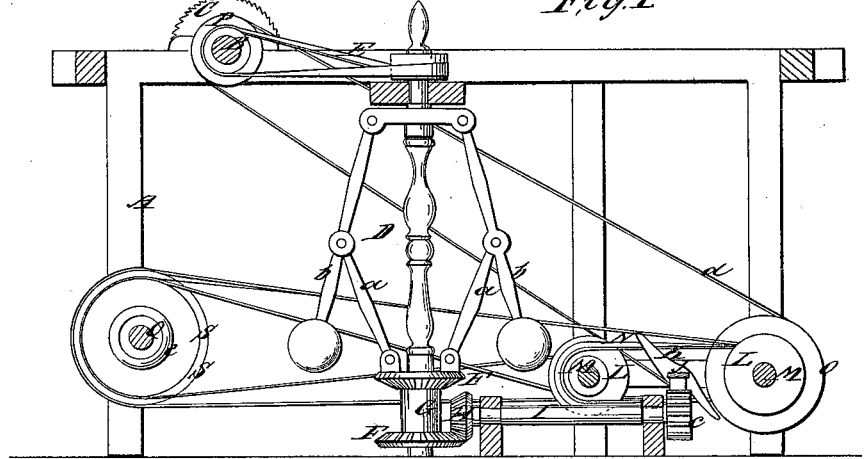
Figure 2:
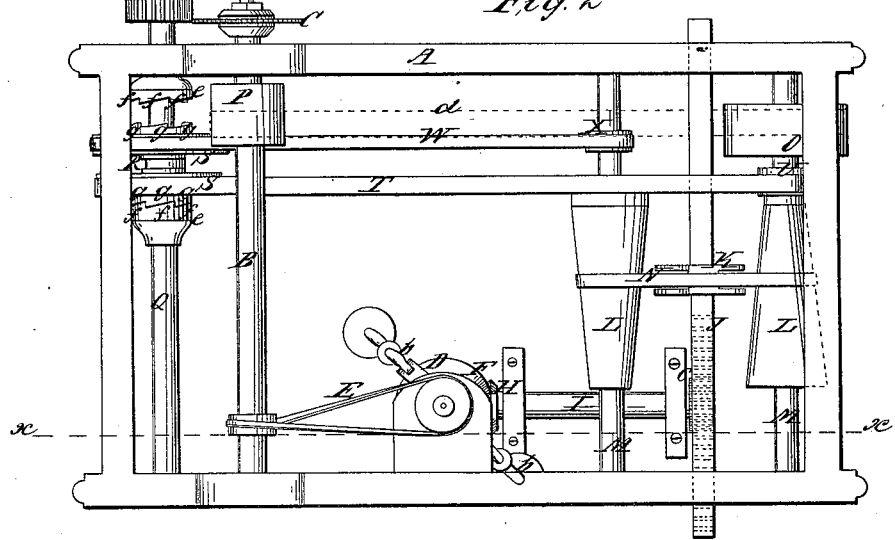

Figure 1, is a longitudinal vertical section of my improvement $(x)$, $(x)$, Fig. 2, showing the plane of section. Fig. 2, is a plan or top view of ditto.

Similar letters of reference indicate corresponding parts in the two figures.

To enable those skilled in the art to fully understand and construct my invention, I will proceed to describe it.

A, represents a rectangular framing constructed in any proper manner to support the working parts.

B, represents a saw shaft placed on the upper part of the framing A. C, is a circular saw placed at one end of the shaft, B.

D, represents a ball governor of usual construction which is driven from the saw shaft B, by a belt, E. The lower part of the governor shaft has two bevel gear wheels, F, F, upon it which wheels are connected to arms $(a)$, $(a)$, attached to the ball arms $(b)$, $(b)$. The bevel wheels F, F, are attached to the upper and lower ends of a collar G, which slides on the governor shaft.

H, is a bevel pinion at the end of a horizontal shaft, I. The pinion, H, is placed between the two bevel wheels F, F, and gears into either of them according as the collar, G, is raised or lowered by the action of the balls of the governor. On the opposite end of the shaft I, there is placed a pinion $(c)$, which gears into a rack bar J, having an arm K, attached to it the ends of said arm being slotted.

L, L, are two cones the shafts M, M, of which are parallel with each other. One cone is placed in a reverse position to the other as clearly shown in Fig. 2. The rack bar J, is placed between the two cones L, L, and slides in proper bearings on the framing A.

N, is a belt which passes around the two cones L, L, the belt fitting in the ends of the slotted arm K.

On the shaft, M, of the outer cone, L, there is attached a pulley, O, which has a belt $(d)$, passing around it said belt also passing around a pulley P, on the saw shaft, B.

Q, is a shaft at the lower part of one end of the framing A. This shaft Q, has a collar R, placed loosely upon it and at each end of the collar a pulley S, is attached. One of these pulleys has a belt T, passing around it said belt also passing around a pulley, V, on the shaft, M, of the outer cone L. The other pulley S, has a cross belt, W, passing around it said belt also passing around a pulley X, on the shaft of the inner cone L.

The collar R, on the shaft Q is placed between two hubs or bosses $(e)$, $(e)$, attached to said shaft. The inner surfaces of these hubs or bosses have ratchet teeth or inclined projections $(f)$, upon them and the outer sides of the pulleys S, have also corresponding teeth or projections $(g)$, upon them see Fig. (2). The hubs or bosses $(e)$, $(e)$, are placed at such a distance apart that when the teeth or projections $(g)$, of one pulley are in gear with the teeth or projections $(f)$, of one hub or boss the teeth or projections $(g)$, of the opposite pulley will be out of gear with the teeth or projections on the opposite hub or boss see Fig. 2. The shaft Q, as it rotates gives motion to the saw mill carriage by means of a rack and pinion. The carriage is of the usual construction. The feed motion is given the shaft, Q, by the cross belt, W, passing around pulley X, of the inner cone shaft, M. And the giging motion of shaft Q, is given by the belt, T, passing around pulley V, of the outer cone shaft M.

Motion is given the saw shaft B, in any proper manner. The saw, C, is to rotate with an equal speed. As the saw shaft rotates motion is given the governor D, by the belt, E, and motion is given the cones L, L, by the belt $(d)$, and motion is given the carriage on which the log is placed by the shaft Q, as previously stated motion being given the shaft Q, by the belt, T. When the butt or thick end of the log is being sawed the saw has considerable work to perform and consequently the carriage moves moderately along and gradually increases in speed as the thickness of the log diminishes in consequence of the arm, K, moving the belt N, along on the cones L, L, the arm K, being operated by means of the rack bar J, and pinion (c). If the saw C binds and rotates very slowly in consequence the collar G, on the governor shaft will be depressed and the upper wheel F, will gear into the pinion H, and a reverse motion will be given the arm K, so that the belt, N, will cause the inner cone to rotate slower than the outer one and diminish the feed and if the saw still continues to bind, so as to bring it down to less than its required number of revolutions the arm K, will cast the belt N, off on a loose pulley at the large end of the inner cone L, and the feed will then be stopped until the carriage is giged back and the saw relieved.

The above invention is extremely simple and is self acting the log is fed to the saw as fast as the saw can cut, the feed of the log increasing as the log diminishes in thickness or according as the work of the saw diminishes.

Having thus described my invention what I claim as new and desire to secure by Letters Patent is,

The combination of the cones L, L, governor, D, and pulleys S, S, arranged and operating substantially as shown for the purpose specified.

HENRY C. GREEN.

Witnesses:
MYRON HALSTEAD,
EDWIN R. SPRAGUE.